Jan. 24, 1939. L. OBER 2,144,705
ELECTRICAL SWITCH MEANS
Filed Aug. 15, 1935 4 Sheets—Sheet 1
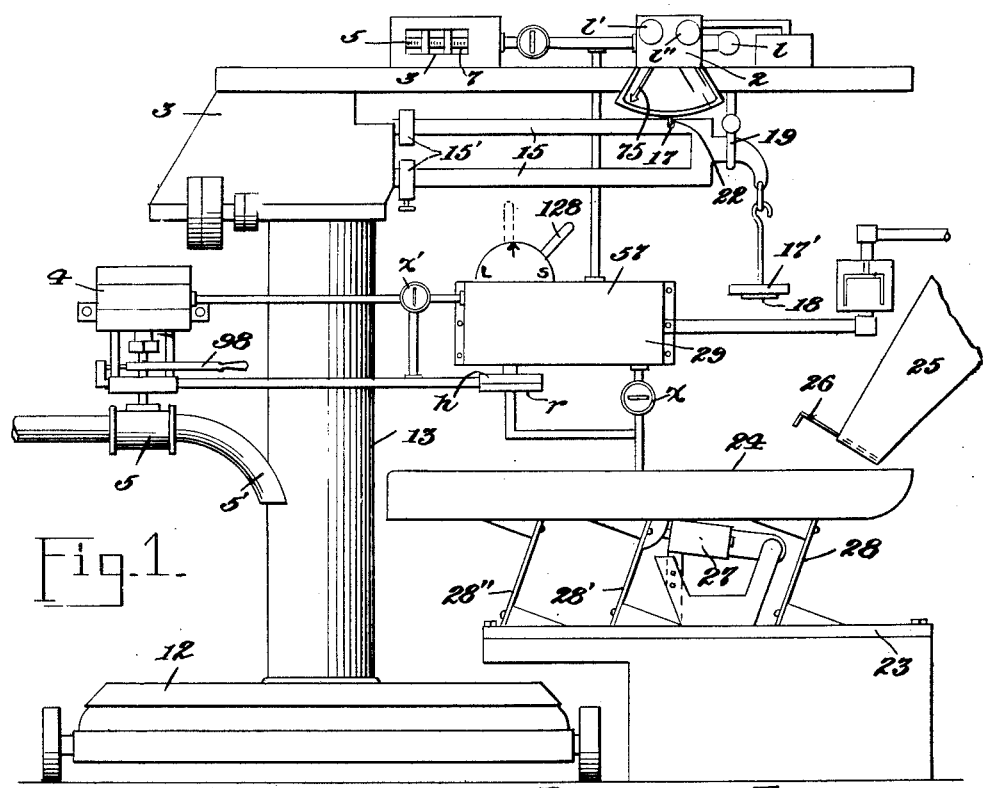
INVENTOR.
Leonard Ober,
BY
J. Wesley Everett
ATTORNEY.

Jan. 24, 1939.  L. OBER  2,144,705
ELECTRICAL SWITCH MEANS
Filed Aug. 15, 1935  4 Sheets-Sheet 2
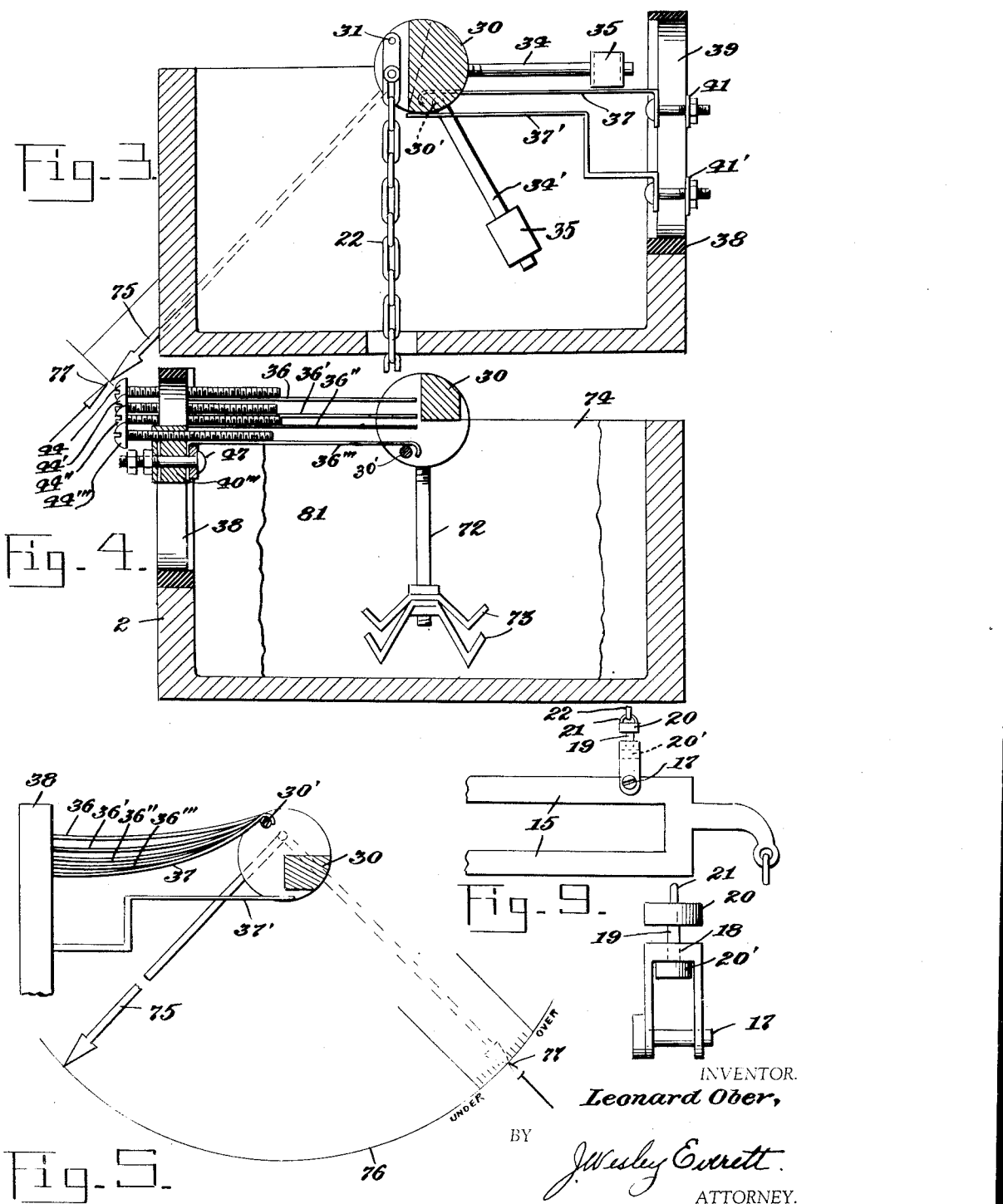

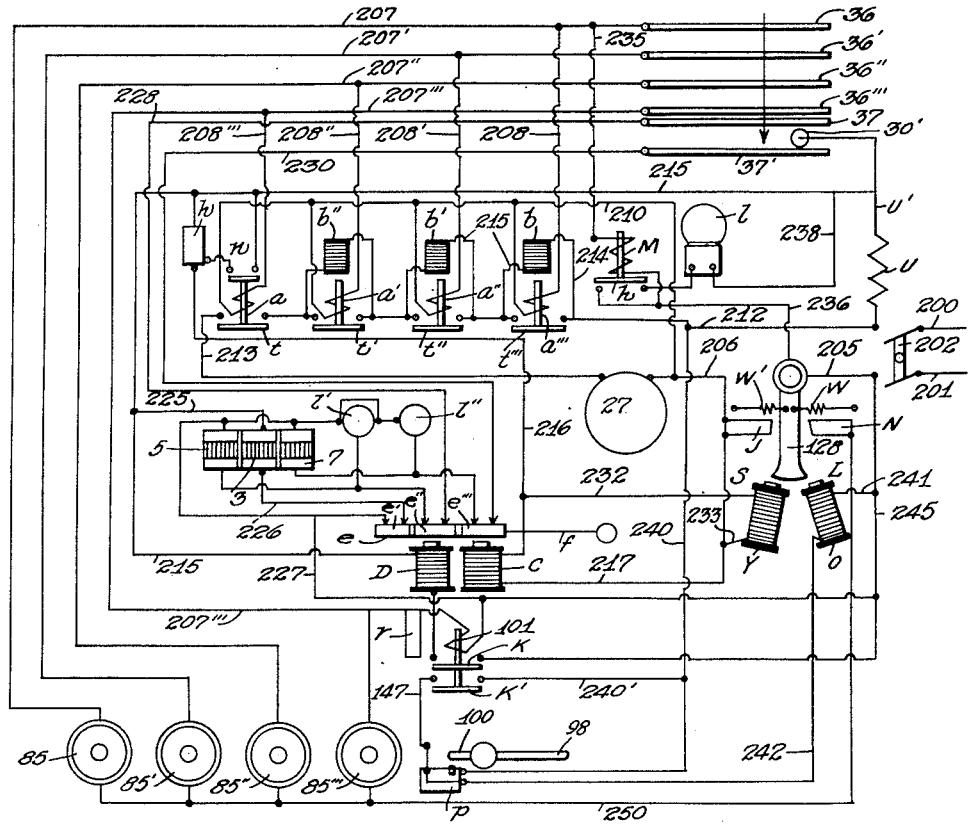
Fig. 15.
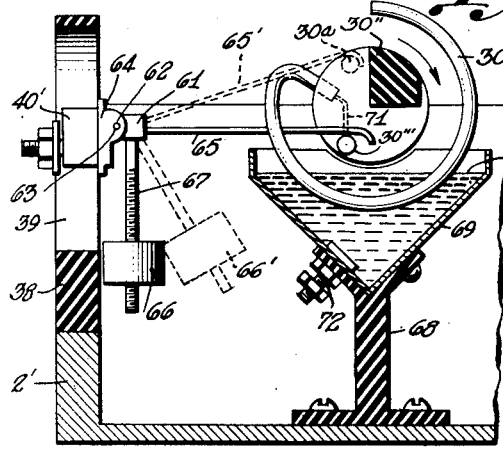
Fig. 7.
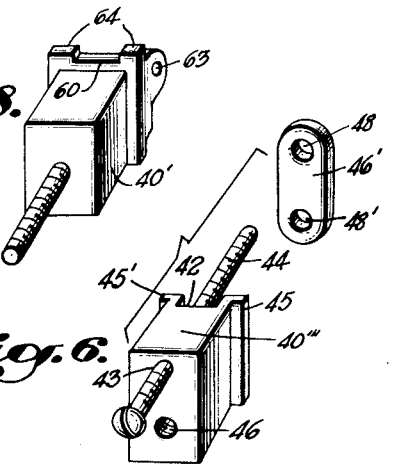
Fig. 8.
Fig. 6.
Inventor:
Leonard Ober
By J. Wesley Everitt
Attorney Jan. 24, 1939.　　　　　L. OBER　　　　　2,144,705
ELECTRICAL SWITCH MEANS
Filed Aug. 15, 1935　　　　4 Sheets-Sheet 4
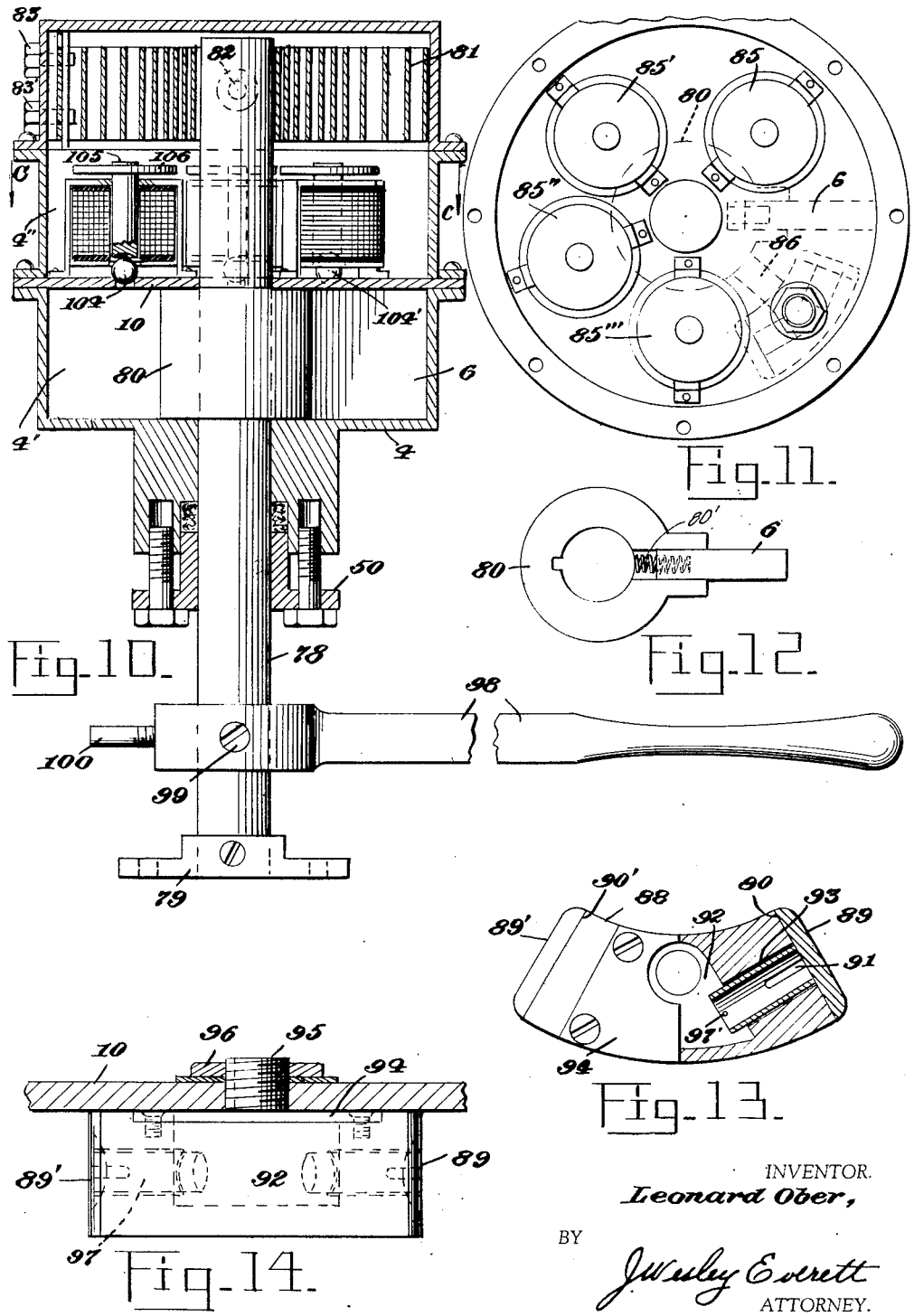
INVENTOR.
*Leonard Ober,*
BY
*J. Wesley Everett*
ATTORNEY.

Patented Jan. 24, 1939

2,144,705

UNITED STATES PATENT OFFICE 2,144,705

ELECTRICAL SWITCH MEANS

Leonard Ober, Baltimore, Md.

Application August 15, 1935, Serial No. 36,263

2 Claims. (Cl. 200—52)

The improved device comprising the present invention is primarily adapted for use in weighing out predetermined quantities from bulk, or fungible material, where speed and accuracy are of chief concern.

In weighing small quantities of material under ordinary commercial weighing conditions, it is often difficult to obtain uniform weights. This is particularly true when the weighing operations are automatic, as these operations are usually carried on with the maximum amount of speed. It is therefore one of the objects of this invention to provide a device that may be used in connection with a weighing scale for controlling a feeder arranged to feed the material to the weighing scale.

Another feature of the invention is to provide a means whereby the automatic control has no effect on the sensitivity of the scale at the point of balance.

A further feature of the invention is to provide an indicating means on the device for indicating whether the scale is in balance and that a pre-set weighing tolerance is not being exceeded.

Still a further feature of the invention is to provide the device with means for controlling a recorder for registering the number of weighings, and also registering such weights as are over or under the pre-set tolerance.

With these and other objects in view as will hereinafter be apparent, the several novel features of the invention in its preferred form will be more fully described in the accompanying drawings in which:—

Figure 1 is a front elevation of the apparatus showing both an electric vibrating feeder and a liquid dispensing means positioned to deposit their contents on a scale platform.

Figure 2 is a perspective view of the control head 2 of Figure 1.

Figure 3 is a cross sectional view taken substantially along the line a—a in Figure 2.

Figure 4 is a cross sectional view taken substantially along the line b—b in Figure 2.

Figure 5 is a diagrammatical view of the electrical contacts and the contact operating means showing the contacts in closed position.

Figure 6 is a view of the adjustable contact supporting member 40''' shown in Figure 4.

Figure 7 is a fragmentary cross sectional view of a modified form of head control means.

Figure 8 is a view of the adjustable contact supporting member 40' shown in Figure 7.

Figure 9 is a view of a connecting link between the scale beam and the contact operating member.

Figure 10 is a cross sectional view of the valve control means 4 shown in Figure 1.

Figure 11 is a top plan view of the valve control means taken along the line c—c in Figure 10.

Figure 12 is a top plan view of the pump element 6 of the valve control means shown in Figure 10.

Figure 13 is a top plan view of the check valve assembly 88 shown in Figure 11 having a portion broken away to show more clearly the valve structure.

Figure 14 is a side view of the check valve assembly showing the method of attaching to the compartment dividing disk 10.

Figure 15 is a wiring diagram of the control circuits.

In all the above described views like characters and references are employed to designate like parts throughout.

In accordance with the illustrated form, Figure 1 shows the general arrangement of the elements comprising the invention, including the positioning of the feeders in relation to the scale, the control head and recording mechanism. This particular arrangement is for the purpose of explaining more clearly the function and operation of the device, but any other arrangement may be made of the component parts to best suit the surrounding circumstances under which the weighings are to be performed.

The invention therefore comprises a scale provided with a suitable platform 12, and an upwardly extended column 13, and a scale beam 15. The scale is of the well known conventional type having sliding weights 15' that slide along the beam and a pan 18 for receiving additional weight when the scale is not operative by the sliding weights. The connecting means between the scale platform and the beam are such that the scale may be operated with comparatively small weight on the beam as compared to that on the scale. The outer end of the beam is usually provided with a link 19 which allows the outer end of the beam to travel through a small arc, the center of which the scale is calculated to be in balanced position.

Connected with the beam 15 is a control head 2. If there is considerable floor vibration, the head is preferably connected to the beam 15 by a small clevis shown in Figure 9 by a pin 17, which is adapted to fit within a proper aperture within the beam. The clevis is provided with an opening 18 within its upper portion. A member 19 is slidably receivable within the opening and retained at the end of its travel by the stops 20 and 20'. The extreme upper end of the member 19 is provided with a link 21 into which a small chain 22, or any other suitable means is fastened for transferring the motion of the beam 15 to the control head. Unless the vibrations are such as to interfere with the proper functioning of the control head, the connecting means is fastened directly to the scale beam.

For dispensing dry materials a continuous vibrating feeder 23 is preferably provided, but any other suitable conveyor may be used, such as a worm screw or the like. The vibrating feeder is provided with a conveyor 24 and is positioned to feed the material into a container on the scale platform 12. The feeder is supplied with material from some suitable source by a shoot 25. The shoot preferably contains a regulating shutter 26 for regulating the height of the material on the conveyor 24. The conveyor is operated preferably by alternating current. The magnetic attraction of the solenoid 27 causes the conveyor to move in one direction and suitable springs 28, 28' and 28'' cause it to move in the other direction. Although indirect current is preferable, direct current may be used by slight changes which are well known in the art. The vibrator is so electrically connected with the wattage reducing unit that the operation of a plurality of electrical contacts within the control head 2 will regulate the flow of current to the solenoid 27 for controlling the amplitudes of the vibrations which in turn will control the flow of material out of the conveyor.

For materials such as liquids and the like, a material control valve 5 has associated therewith an automatic valve control means 4. This control means is also electrically operated by the control head and is so actuated to control the flow of materials on the scale platform through the pipe 5'.

Referring again to the control head 2, the upper end of the connecting member 22 is eccentrically mounted to a movable contact operating member 30 by the pin 31. The member 30 rests by knife edges 32 and 32' upon suitable bearings 33 and 33'. An arm 34 is rigidly secured to the operating member 30 carrying a small weight 35 receivable upon its outer end portion. The weight is used particularly for keeping the connecting means between the beam and contact operating member taut and operating the member 30 through the portion of the travel of the member not influenced by the tension of the contact springs. The weight also may be used to supply an increased torque to the operating means in addition to that created by the contact members, which will be hereinafter more fully described.

The general outline of the operating means 30 is shown to be cylindrical in form having a portion cut away to allow for the operation of a plurality of contact members 36, 36', 36'', 36''', 37, and 37'. A contact bar 30' is also eccentrically mounted to the member 30 within the cut away portion for the purpose of engaging the above mentioned contact members when the member 30 is rotated about its axis by the downward movement of the scale beam. The bar 30' is normally positioned as shown in Figures 3 and 4 when the scale beam is in balanced position, being out of contact with all the contact members and below a horizontal plane passing through the central axis of the member 30. When the member 30 is rotated the bar 30' moves to a position above the horizontal plane and in contact with the contact members as shown in Figure 5. As the member 30 is again rotated to its normal resting place, the contact members are successively broken, a number of the subsequent ones being broken while the member 30' is moving downwardly from the horizontal plane. The breaking of these contact members below the plane offers a minimum amount of friction in the operation of the control operating member, as the bar is moving in a general direction more perpendicular to the force of the contact spring.

Inserted in one side of the control head is a section of insulated material 38 having a plurality of vertical slots 39. Slidably mounted within the slots 39 are members 40, 40', 40'', 40''', 41, and 41', upon which are conveniently mounted the contact springs 36—36''', for regulating the feeding control means and members 37 and 37' for selectively closing the circuit to the over and under recording mechanism. Referring particularly to Figures 4 and 6, the slidable member 40 has on its inner face a cut away portion 42 into which the contact member is mounted by soldering or other suitable securing means. Positioned above the upper surface of the contact member is a threaded aperture 43 into which a threaded member 44 is receivable. The member 40 is also provided with flanges 45 and 45' for contacting the edge of the slot 39 within the insulated member 38. A second aperture 46 is provided within the member 40 to receive a small bolt 47. A plate 46' is provided to extend over the slots 39 and adjacent the outer face of the member 38 having apertures 48 and 48' to respectively accommodate the threaded member 44 and the small securing bolt 47. By tightening the bolt 47 the flanges of the member 40 will be drawn against the inner wall of the member 38 and the plate 46' will contact the outer surface, thereby providing a very practical adjustable securing means for the contact members.

The contact members are preferably made of some suitable spring material and by rotating the member 30 to the position as shown in Figure 5 the contact member 30' will contact the members 36—36''', and member 37, spring them upwardly. The contacts will then exert a torque to the member 30 substantially equal to the force applied to the member 30 in the first instance by the downward movement of the scale beam.

The threaded members 44—44''' are so located in relation to the contact members to extend over and parallel to the upper surfaces thereof. By operating the threaded members they may be moved along the upper surface of the contact spring members. When it is desirable to increase the torque of these spring members, the threaded members are screwed inwardly and for reducing the torque they are screwed outwardly.

As each of the contact members are independently adjustable, this will provide for the breaking of the individual contact members with the contact bar 30' at any predetermined point along its travel and by being able to adjust the tension of these contact members, any predetermined force within the limits of the device may be exerted by the contact spring members through its pre-set travel with the contact bar 30'. With this arrangement a maximum speed in weighing operations is obtainable within any allowed tolerance.

A modified form of control head is shown in Figures 7 and 8. The housing 2' and the number of contact members are substantially the same as shown in Figure 2 including the insulated panel 38 and the vertical slots 39. The member 40' being substituted for the member 40. This member has formed on its inner side a bifurcated portion 60, into which is received a member 61. This member is freely mounted to rotate about a pin 62 extending through the apertures 63 of the portions 64. Extending outwardly from and secured to the member 61 is a contact member 65. A weight 66 is receivable upon the arm 67 which is suspended from the member 61 supporting the contact member 65. When the contact operating member 30'' is rotated in the direction of the arrow, the member 30'''' will move as shown by the dotted line 30a and the contact member will be moved to the position as shown by the dotted line 65'. The weight 66 will be moved away from its vertical position as shown at 66'. The weight will cause a torque to be exerted to the member 30'' similar to that described by the spring contact members hereinbefore. This torque may be varied by either moving the weight along the arm 67, or by the addition or subtraction of the amount of the weight supported thereon. The member 40' is also adjustable within the slots 39 as has been described for the member 40. In this modification the contact operating member 30'' is shown to be made of some suitable insulated material into which is secured the contact bar 30''' for insulating the contact bar from the housing 2' of the control head. Mounted within the housing upon an insulated member 68 is a container 69 filled with a supply of mercury 70, which is located substantially beneath the contact operating member 30''. The insulated contact operating member 30'' is provided with an outwardly projecting circular arm member 30b which is connected with the contact bar 30''' by a suitable conductor 71. The member 30b is adapted to be in contact with the mercury throughout the complete travel of the contact operating means. A suitable electric contact 72 is located within the container 69 and in contact with the mercury for completing the circuit to the contact members 30''' when the mercury is in contact with the bar 30b. It is understood that this mercury contact may be equally as well employed with the spring type of contacts shown in Figures 2 to 6, inclusive.

The contacts 37 and 37' (Figure 3) are each positioned on either side of contact bar 30' for the purpose of selectively closing an electric circuit for operating a registering device for recording separately the weighings "over" and "under" a predetermined tolerance. These contacts are likewise adjustable for allowing for a substantial amount of free movement of the contact bar 30' without making contact therewith. This free movement is provided adjacent the point of balance of the weigh beam and is the range of tolerance allowable in weighing operations.

When using the weight 35 for the torque influencing means for the member 30 the weight is positioned substantially on the member 30 as shown in Figure 3. When the weight is in this position, the scale beam is in balanced position. The weight will be raised upwardly as the scale beam is depressed, increasing the lift on the beam at a trigonometric ratio with respect to the actual movement of the beam, likewise the lift will be decreased on the beam in the same proportions as the scale approaches the balanced position, thereby reducing the torque influence to a minimum at the point of balance.

The contact operating member 30 has secured thereto an arm 72 having a plurality of paddles 73 on its lower end and extending into a chamber 74, which is filled with liquid so that the structure operates as a dash pot for dampening any vibrating movement of the rotating contact member 30 which may be caused by the successive breaking of the contacts and the frequent change in torque influence.

The contact operating member has also an indicating arm 75 attached thereto and designed to move across a dial 76 for a considerable distance where it will indicate by a point on the dial that the scale beam is in balanced position (shown in Figure 5 at 77). The dial has also visible indications laid out on either side of the point 77 marked "over" and "under". This is to give the operator a visible check on the functioning of the scale. The operator will know the working tolerance allowed on the material being weighed and will operate and adjust the scale within these limits.

Referring against to the automatic valve control means, Figures 10–14, the control is constructed to be operated by the manipulation of a liquid through its several compartments. The liquid required in the control chamber 4 should be sufficient to fill the lower compartment 4' and a small amount in the upper compartment 4'', the object being to have the compartment in which the pump element 6 is to operate completely filled with liquid. The compartments 4' and 4'' are separated by a disc 10. Extending vertically through the center of the housing 4 is a shaft 78 having a coupling 79 on its lower end for making a connection with a material shut off valve. The rotary pump element 6 is mounted within the compartment 4' by means of the member 80 which is firmly secured to the shaft 78, and is held outwardly in contact with the outer wall by a spring 80'. The upper end of the shaft is tied to a coil spring 81 by the bolt 82, the other end of the spring is fastened by the bolts 83 and 83' to the stationary housing 4. Located within the compartment 4'' and preferably on the plate 10 are a plurality of solenoids 85, 85', 85'', 85''', operating valves between compartments 4' and 4''. The compartment 4' is provided with a vertical wall 86 extending outwardly from the member 80 dividing compartment 4' completely, only for a check valve in either side thereof. The check valve assembly 88 is constructed to relieve the vacuum from behind the pump element 6 and close when the element is moving toward the check. The valve assembly shows a structure comprising two valves 89 and 89' adapted to fit upon valve seats 90 and 90'. The valve stem 97 is hollow and provided with openings 91 adjacent the top thereof. The remote end of the stem being open and leading into a chamber 92 through the opening 93 in the valve assembly. Connected to the top portion of the valve assembly 88 is a plate 94 carrying thereon a hollow nipple 95 which is adapted to be received within an aperture through the disc 10 and held in position by a suitable nut 96. The nipple opening leads into the chamber 92 and forms a means through which the liquid from compartment 4'' may flow into compartment 4' in one direction on each side of the wall member 86 by way of the valves. The movement of the valves are limited by placing a key 97' through an opening in the lower end of the valve stem for contacting the edge of the opening 93 when the valve member is withdrawn. A stuffing box 50 is provided around the shaft 78 and positioned below the compartment 4' to prevent the leaking of the fluid from the pump compartment. Securely mounted to the shaft 78 below the stuffing box, is an operating lever 98 fastened to the shaft by a suitable pin 99 for turning the valve control against the coil spring 81. The handle or lever is provided with a member 100 for operating a switch P when the lever has been rotated to a position to open the material valve 5.

In operating the valve control, shaft 78 is rotated compressing the coil spring 81. The solenoids 85—85''' are energized by the closing of a suitable switch P when the pump element 6 has reached the end of its travel. The solenoids are provided with members 105 operating small ball valves 104 within the disc 10. Secured to the member 105 is a member 106 which is attracted by the solenoids. When the valves are closed the liquid is prevented from escaping from the pump compartment 4' thereby preventing any movement on the valve control means. When the scale beam operates the electrical contacts within the head 2 the solenoids 85—85''' are successively deenergized by the breaking of the contacts 36—36''', respectively with the contact operating member 30'. The spring 81 will rotate the pump forcing the liquid out through the valve 104. The pump is prevented from moving to the next successive valve until it has been released by deenergizing the solenoids through the control head.

For the operation of the device a suitable supply of electric current is furnished by the supply lines 200 and 201, which are connected with the wiring system of the weighing device through a master switch 202.

In operating the vibrating feeder the scale is usually balanced with the container to be used, by mechanism usually found in the scale head 3, or by changing the weight on the pan 18. At this point the beam 15 will be substantially in the center of the link 19 and the indicating arm 75 should rest on the point 77 of the dial 76. Now by moving the weights 15' outwardly toward the end of the beam, or by placing the weight 17' on the pan 18 the beam will be moved downwardly to rest against the bottom portion of the link 19. This movement through the connecting means 22 which is eccentrically mounted on the member 30 and which is at this time above the axis of the member 30 will cause it to rotate, moving the indicator arm 75 a considerable distance away from the point 77. The contact bar 30' will move from its position as shown in Fig. 4 to the position as shown in Fig. 5, making contact with the contact members 36—36''' and 37. With all the above contacts closed with the bar 30' in the control head 2 and by moving the lever 128 to the side marked S, current will flow from supply lead 201 through the wire 205 to the lever 128 and the contact member J and wire 206 to one side of the vibrating motor 27. At the same time current will pass from the supply line 200 passing through the resistance coil U through the wire U' to the contact bar 30' through the contact members 36—36''' to one side of the relays a—a''' by way of the wires 207—207''' and wires 208—208'''. The other side of the relays are connected to the wire 210 which in turn is connected with the supply line 201 through contact J. By closing the switch by moving the lever 128 in contact with terminal J the coils within the relays will become energized closing the switches t—t'''. Current will now flow from supply line 200 through the wire 212, through the relay switches and wire 213 to the opposite side of the vibrator motor 27 for completing the circuit to the motor 27 for operating the conveyor.

As has been previously stated the downward movement of the scale beam will cause the contact operating member 30' to move upwardly and when the scale beam moves upwardly as the scale approaches a balanced position the member 30' will move downwardly as indicated by the arrow in Fig. 15.

This upward movement of the weigh beam causes the member 30' to successively disengage the members 36—36'''. When the first contact member 36 is disengaged from the member 30', relay a''' will be deenergized and the switch t''' will be thrown out and the current will be carried through the resistance coil b by wires 214 and 215, thereby reducing the current supply to the vibrator motor 27. Likewise when the contact 36' and the member 30' is broken the resistance coil b' will further reduce the current supply to the vibrator 27, the same is true when 36'' is disengaged from the member 30', resistance b'' will be introduced into the vibrator motor circuit to still further reduce the capacity of the conveyor. The resistance in the vibrator motor circuit at this point is such that the capacity of the conveyor is cut down to a point where the variations present in the materials in suspension between the feeder and the scale platform will not exceed the allowed tolerance. When contact between the operating member 30' and the contact member 36''' is broken relay a is deenergized and will act to break the circuit completely through switch t to the vibrating motor 27. At this point the scale should be just short of being in balance. The materials in suspension between the conveyor and the scale platform are sufficient to bring the scale in balance within the above mentioned working tolerance.

The contact member 36''' has another function, which includes closing a pair of electrical circuits for controlling the recording mechanism. These circuits acting to energize one of the solenoids C or D which will be later more fully explained. The over and under recorders are selected by the contacts 37 and 37'. The relay a along with its other duty also controls the circuit to the solenoid C for the timing of the recording of the total number of weighings and also for the timing of the over and under recorders. At the beginning of the weighing operation when relay a is energized it closes a switch n which closes a circuit for the energizing of the solenoid C. This moves the bar e downwardly against the tension of the spring f. When the relay a is deenergized as has been before described, the circuit is broken by the switch n similar to that described for the switch t. The time switch h will function to delay the deenergizing of the solenoid C for the purpose of allowing the material in suspension to reach the scale platform and also time for the scale to recover from the impact influence of the falling materials before the recording mechanism is operated. The bar e is for the purpose of closing the circuits to the recorders or counters and is constructed of some suitable conductive material and divided into sections e', e'', and e'''. When the bar e has been moved by the action of spring

*f* in position to close the circuit to operate the counters 3, 5, and 7, the current to the total counter 3 is carried by the wire *u'*, wire 215 and the wire 225 to one terminal of the counter and from the other terminal by the wire 226 through the conductor *e'*, wire 227 to the other side of the supply line 201. If the contact operating member 30' is in contact with the contact member 37 the "under" recorder 5 will operate. Current will flow through the member 30', wire 228 and through the plate *e''* to one side of the counter 5, the other terminal of the counter is connected with the wire 227 which is connected with the opposite supply source. If the contact operating member 30' is in contact with the contact member 37' current will flow through the wire 230, the conductor *e'''* to one side of the "over" counter 7, the other terminal of the counter being connected with the supply source by the wire 227.

In the same circuit with the solenoid C is the solenoid Y which is connected by wire 232 to the wire 216 and by wire 233 to the wire 217 leading to the solenoid C for the purpose of energizing the solenoid Y to hold the control lever 128 in contact with the contact J. When this solenoid is deenergized, along with the deenergizing of the solenoid C, the lever is moved to a neutral position by the springs *w* and *w'*, cutting off all the current to the control head.

Operating independently of the control lever 128 is a lamp L having associated therewith a relay M which is connected with the contact mmeber 36 in the control head by wire 235, the other side of the relay being connected with the supply line 201 by the wire 236 for energizing the relay. When contact is broken between the member 36 and the operating member 30' the relay will be deenergized allowing the switch *h* to close the circuit through the wires 236 and 238 to light the lamp L. This also happens to be the same point in the weighing operation where the control head operates to reduce the capacity of the feeder. The object of this light is to provide an additional signal to the operator that the scale beam has started its travel toward its balanced position. The light will not be extinguished by the movement of the lever 128 breaking contact with the contact members J or N, but will continue to be lighted until the container has been removed from the scale or extra weight has been added to the scale beam to prepare for a new weighing operation, which will cause the contact bar 30' to move upwardly again to the position shown in Fig. 5 forming contact with the member 36 which will in turn energize the relay M which will operate the switch *h* to break the circuit to the lamp.

There is also associated with the over and under counters lights L' and L'', which will be lighted upon the operation of their respective counters. These lights are adapted to be burning only while the contact bar 30' is in contact with the members 37 or 37' and before a new weighing operation is started for signaling the operator that the weight was not correct.

The operation of the liquid feeding means using the type of valve as shown in Figs. 10–14 has a recording apparatus and control head as has hereinbefore been described for the vibrating feeder. The material flow valve 5 is operated by the valve control means 4. By rotating the pump element 6 by the lever 98 against the tension of the spring 81 the material valve is operated to open position. A member 100 or similar means will operate a switch *p* which is connected with one side of the current supply line 200 by the wire 240. Switch *p* will close a circuit leading to solenoid O through the wires 240 and 242, which is connected with the supply line 201 by the wire 241. The energizing of solenoid O will move the lever 128 in contact with terminal N, which in turn will supply current to the head and the valve control mechanism for energizing solenoids 85—85'''. When the scale is adjusted for a weighing operation, current will flow through the member 30' to contacts 36—36''' as has been previously explained and by wires 207—207''' to the solenoids 85—85''' and back through the wire 250 to terminal N. When the scale approaches a balanced position and the beam moves upwardly the contact operating member 30' as has been previously described will successively break contact with the members 36—36'''. When contact is broken between the operating bar member 30' and contact 36 it will break the circuit and deenergize the solenoid 85. This will allow the ball valve 104 to be released and permit the pump element 6 to force the fluid in the chamber 4' out through the valve 104 and into the chamber 4'' until the pump element has arrived opposite the open valve, where it will remain until the second solenoid 85' has been deenergized by member 36' breaking contact with the member 30' in the control head in a similar manner. This operation is repeated until all of the solenoids 85—85''' have been deenergized.

When solenoid 85''' has been deenergized the lever 98 will be allowed to return to its original starting point and cut off the material supply valve 5. Connected with the contact member 36''' is a relay 101, the other side of the relay being connected with the electrical supply source 201 by the wire 245. When the member 30' is in contact with the contact member 36''' the relay becomes energized and closes switches *k* and *k'*. The switch *k* will close a circuit to solenoid D, which has the same function as solenoid C, through the wires 215 and 245. A time switch *r*, similar to time switch *h*, of suitable construction is inserted within the line 207''' for momentarily delaying the operation of the relay after the weighing operation for the purpose previously explained. Switch *k'* will close an additional circuit to the solenoid O by the wires 240, 240', 147, and 242 for supplying current to the solenoid O after the circuit made by the starting switch *p* has been broken. When the relay 101 is deenergized it will operate to break the circuit to the solenoid O, which will in turn be deenergized and allow lever 128 to return to its neutral position. Switch *p* is of a push spring type and is only used in starting for energizing the solenoid O.

Referring to Figure 1 when the lever 128 is moving to the position marked S indicates that the circuits are closed for using the vibrating feeder and when moved to the position marked L the circuits are closed operating the liquid feeder. The circuits may also be provided with additional switches *x* and *x'* for cutting out either the dry or liquid feeders.

The advantage of the improved device, is that the speed of the weighing operation may be substantially increased within any given working tolerance and making a permanent record of each weighing, and of such weighings that are "over" and "under" the allowed tolerance. The construction of the device is such that it can be very economically manufactured and easily adapted to practically all weighing apparatus.

While I have described my invention referring to certain details of construction as well as the form and advantages of the same, it is for the purpose of illustration only and I do not wish to be limited thereto except as may be pointed out in the following claims.

Having thus described my invention what I claim is:

1. An automatic control head for a weighing scale comprising a frame, a rocking member mounted upon suitable bearings upon said frame, a connecting member for connecting the scale and the rocking member for operating said rocking member through a predetermined arc, a plurality of electrical contacts positioned to contact the said rocking member through a portion of its travel to close a series of electrical circuits connected with a feed control unit, means for producing a torque influence to the rocking member opposite to that created by the motion of the scale, means for regulating the torque through any portion of the travel of the said rocking member.

2. An automatic control head for a weighing scale comprising a support, a movable member operative upon said support, a connecting member connecting the scale with the movable member for operating the same, a plurality of electrical contacts each positioned to contact the said movable member through a portion of its travel to successively close a series of electric circuits connected with a feed control means, said electrical contacts adapted to produce an opposing force to the said movable member opposite to that created by the motion of the scale when the scale is out of balance.

LEONARD OBER.